(12) United States Patent
Monen et al.

(10) Patent No.: US 7,391,701 B2
(45) Date of Patent: Jun. 24, 2008

(54) METHODS AND SYSTEMS FOR IN-TRACK OPTICAL POSITIONING

(75) Inventors: Marinus J. Monen, Stow, MA (US); Maarten R. deHaan, Newton, MA (US)

(73) Assignee: Opternity Storage, Inc., Cambridge, MA (US)

( * ) Notice: Subject to any disclaimer, the term of this patent is extended or adjusted under 35 U.S.C. 154(b) by 129 days.

(21) Appl. No.: 11/504,754

(22) Filed: Aug. 14, 2006

(65) Prior Publication Data

US 2007/0036042 A1 Feb. 15, 2007

Related U.S. Application Data

(60) Provisional application No. 60/708,598, filed on Aug. 15, 2005.

(51) Int. Cl.
*B11B 3/74* (2006.01)
*G11B 7/00* (2006.01)

(52) U.S. Cl. .................................. 369/97; 369/44.11

(58) Field of Classification Search .................. 369/97, 369/96, 44.11, 44.38
See application file for complete search history.

(56) References Cited

U.S. PATENT DOCUMENTS

| 5,120,136 A | 6/1992 | Oakley ........................ 369/97 |
| 5,581,534 A | 12/1996 | Van Rosmalen et al. .... 369/112 |
| 6,853,652 B2 * | 2/2005 | Lee et al. ...................... 360/30 |
| 6,961,200 B2 * | 11/2005 | Lee et al. .................. 360/77.12 |
| 7,029,726 B1 * | 4/2006 | Chen et al. ................... 427/555 |
| 2005/0117493 A1 | 6/2005 | Sueki et al. .................... 369/96 |
| 2005/0195510 A1 * | 9/2005 | Skaar et al. .............. 360/77.12 |

FOREIGN PATENT DOCUMENTS

| JP | 02101650 | 4/1990 |
| JP | 03100921 | 4/1991 |
| JP | 07161053 | 6/1995 |
| JP | 2005166164 | 6/2005 |
| JP | 2006236406 | 9/2006 |
| WO | WO 91/04556 | 4/1991 |
| WO | WO 94/07330 | 3/1994 |

* cited by examiner

*Primary Examiner*—Thang V. Tran
(74) *Attorney, Agent, or Firm*—Burns & Levinson LLP; Orlando Lopez

(57) ABSTRACT

Methods and systems for formatting of optical media used for data or information storage.

17 Claims, 5 Drawing Sheets

Block diagram of one embodiment of the across-track formatting system.

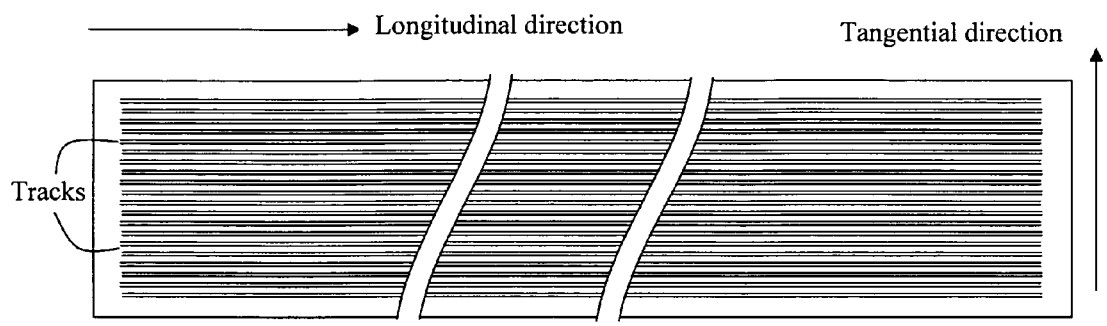
Figure 1. Plan View of Optical tape with tracks in the longitudinal direction
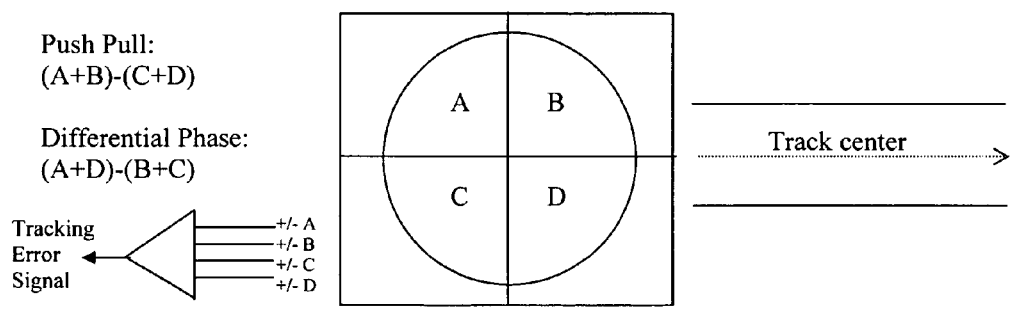
Figure 2. Derivation of Push Pull Tracking and Differential Phase Tracking signals from the 4 quadrants of the diode that captures the reflected beam from the tape surface.

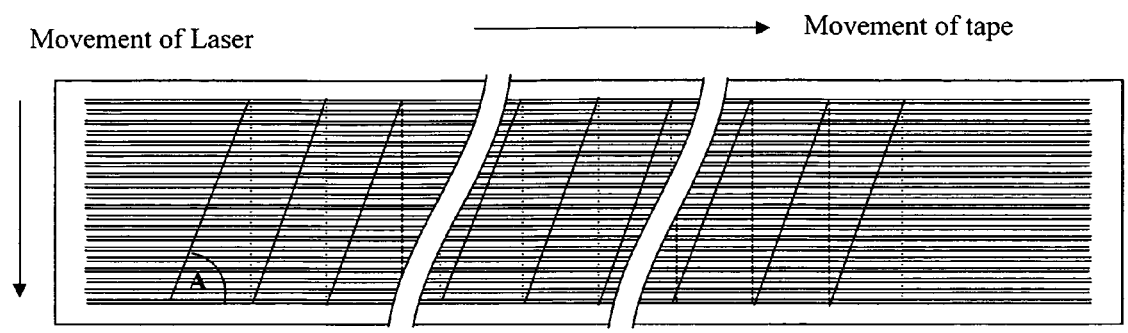
Figure 3. The "Sawtooth" path on the tape of the formatting laser beam
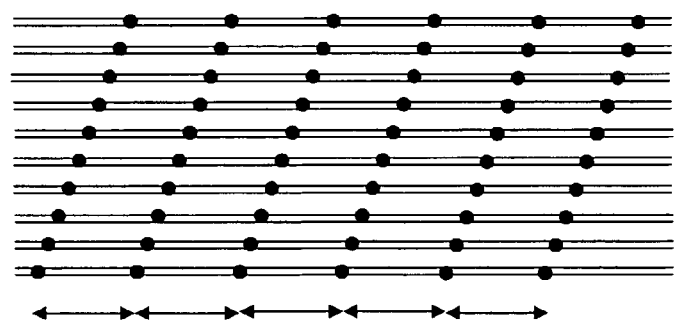
Figure 4. Configuration of servomarks on the tape after formatting

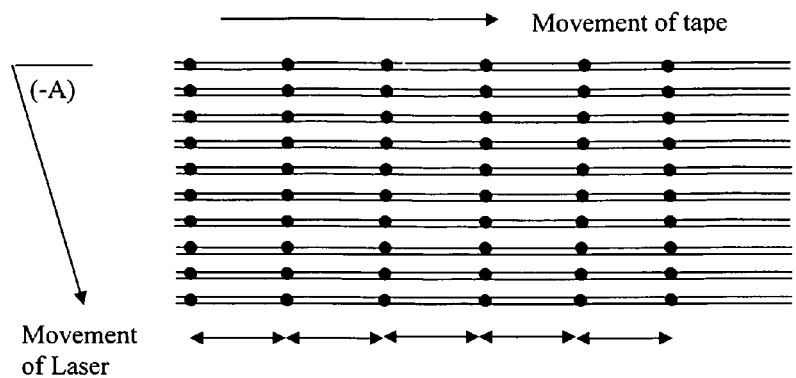
Figure 5. Writing of servomarks with a beam direction under angle A
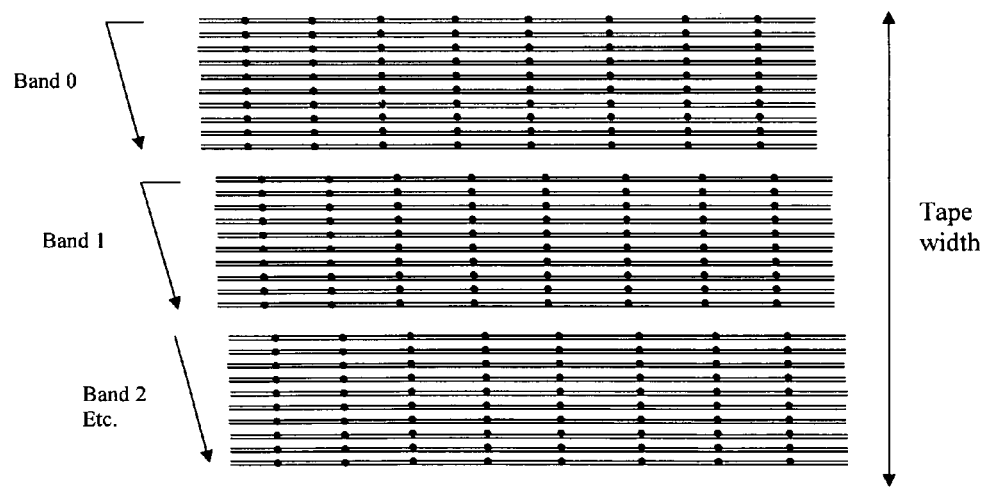
Figure 6. Simultaneous formatting of multiple bands of tracks with multiple laser beams.

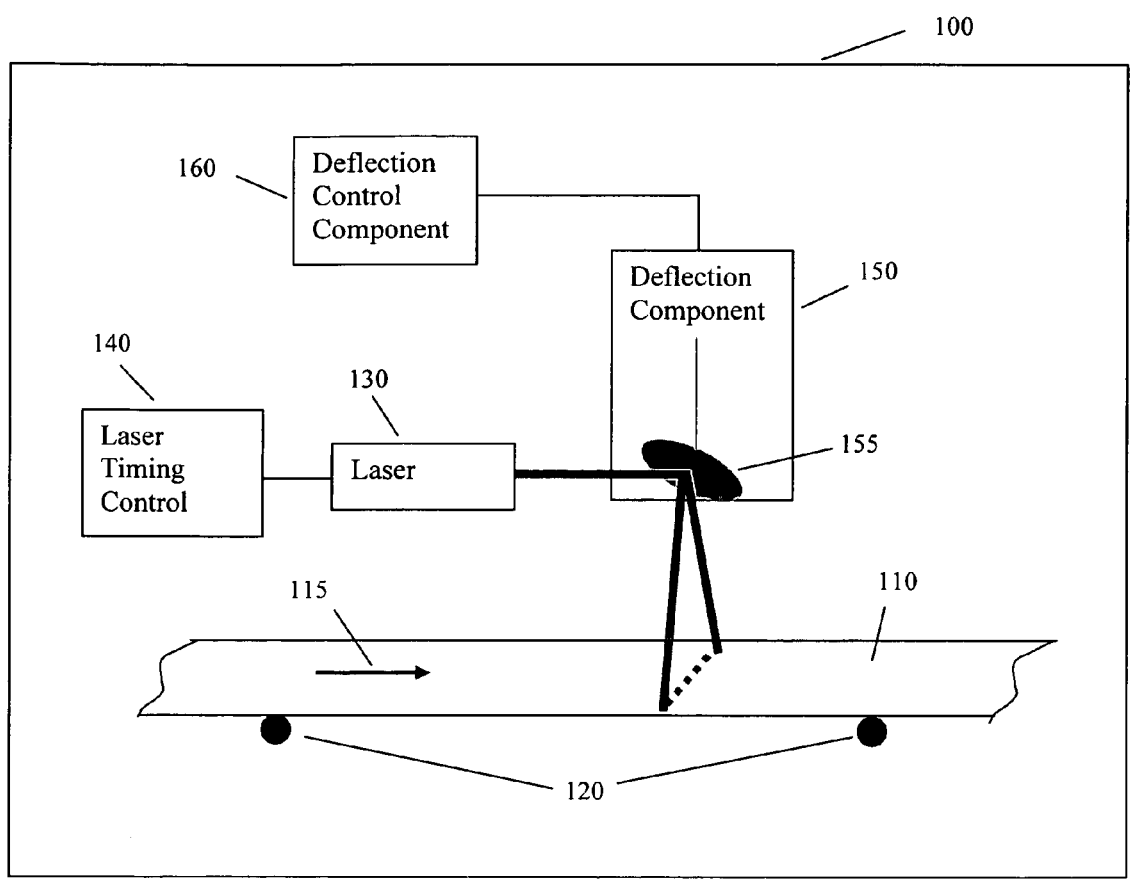
Fig 7. Block diagram of one embodiment of the across-track formatting system.

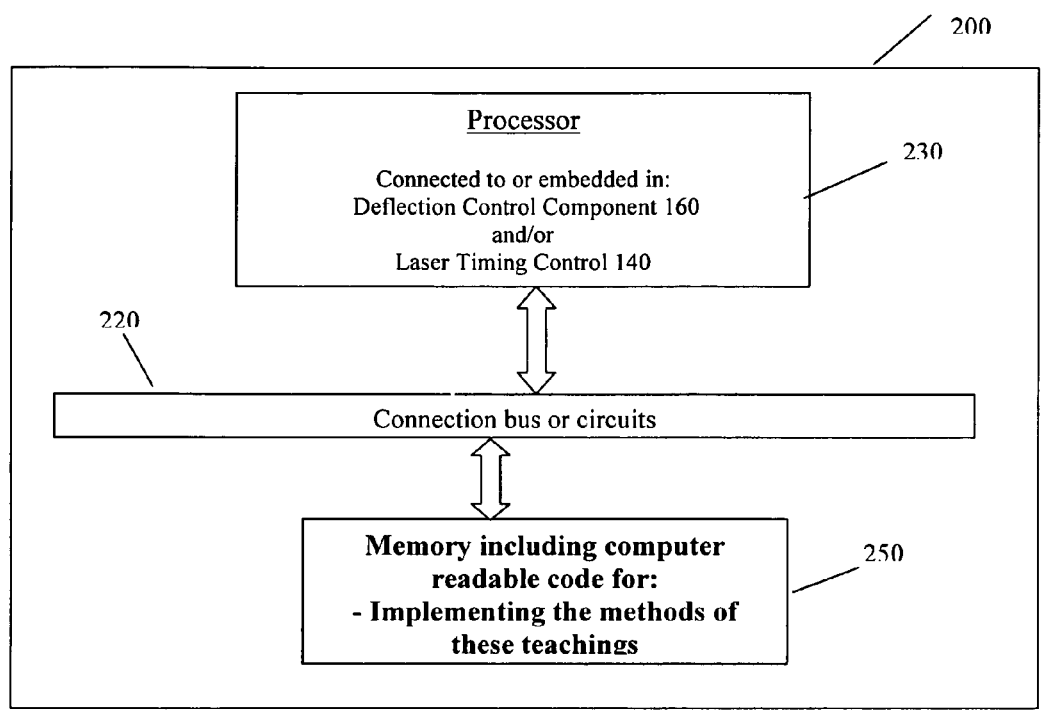
Figure 8. Block diagram of a processor component of one embodiment of the across-track formatting system.

METHODS AND SYSTEMS FOR IN-TRACK OPTICAL POSITIONING

CROSS REFERENCE TO RELATED APPLICATIONS

This application claims priority of U.S. Provisional Application 60/708,598 entitled "IN-TRACK OPTICAL POSITIONING SYSTEM FOR HIGH-DENSITY TAPE RECORDING USING ONE-PASS ACROSS-TRACK FORMATTING," filed on Aug. 15, 2005, which is incorporated by reference herein.

BACKGROUND

These teachings relate generally to optical media, and, more particularly, to the formatting of optical media (in an exemplary embodiment, optical tape) used for data or information storage creating a distributed and dispersed pattern of optical marks in such a manner that the reading of this pattern allows for the substantially precise following of the center of each data track.

The recording and reading of data to and from an optical surface such as CD/DVD and other optical media such as optical tape considered in these teachings requires the precise positioning of the write/read laser beam on an identifiable track.

In case of recordable CD/DVD tracks are formed as continuous structure (grooves) as part of the injection molding manufacturing step of the media. These grooves are optically detectable and provide servo information to the actuator that positions the beam on the center of the track and keeps it there.

In the case of optical tape, which is typically hundreds of meters long, the creation of grooves, which typically would run in the longitudinal direction of the tape, is a major technological challenge and hurdle. To do this with great accuracy for several thousands of tracks in parallel leads to a time consuming and uneconomical production of such grooves on tape.

It is therefore a need to provide a different structure that can be applied to the tape in a reliable mode during the manufacturing step of the tape (the so called formatting step) and that contains enough information to provide for the track following function, while allowing enough free space for the recording of user data later on.

It is a further need to be able to perform this formatting operation in a fast one-step process, where the formatting of all tracks is done simultaneously while moving the tape from one end to the other.

There is a need for a structure of "servomarks" that is simple to generate and that satisfies both the need for efficient formatting during tape manufacturing as well as the need for a reliable positioning grid, used during recording or reading of user data, that provides precise tangential position information with respect to the track direction as well as precise longitudinal position information. The tangential information so derived will be used as input for the track servo and the longitudinal information will be used for clock synchronization and identification of data blocks.

BRIEF SUMMARY

In one embodiment of the method of these teachings, servomarks are created on the tape while moving over the tape with high speed in the tangential direction, while the tape itself is moving at a different speed in the longitudinal direction. The positioning of these marks is such that they will be substantially aligned in the longitudinal direction to form strings on each "virtual" longitudinal track. These patterns will be used during read/write operation of the tape to generate tracking information using a "sampled servo" system.

In another embodiment, the servomarks in adjacent tracks are aligned in such a manner that they are substantially aligned in the tangential direction. This enables substantially identical synchronization between adjacent tracks, which allows for random-access track jumps without having to re-acquire synchronization of clock and tracking servo sample signals.

For a better understanding of the present teachings, together with other and further objects thereof, reference is made to the accompanying drawings and detailed description and its scope will be pointed out in the appended claims.

BRIEF DESCRIPTION OF THE DRAWINGS

FIG. 1 is a plan view of an optical tape segment showing the longitudinal and tangential direction of the tape;

FIG. 2 depicts a conventional quad diode configuration used in the detection of focus error, tracking error and data signals;

FIG. 3 depicts the path created, in one embodiment, by a formatting laser beam on the tape as a result of two movements, notably the movement of the tape in the longitudinal direction and the movement of the laser beam in the tangential direction,;

FIG. 4 represents an embodiment of a configuration of servomarks on the tape after formatting;

FIG. 5 represents an embodiment of the configuration of servomarks on the tape after formatting with a direction of the beam deviated from the tangential direction under an angle A as shown in FIG. 3;

FIG. 6 is a view of an embodiment of an optical tape segment where the tracks are grouped in a number of bands;

FIG. 7 is a schematic block diagram representation of an embodiment of the across-track formatting system of these teachings; and FIG. 8 is a schematic block diagram representation of an embodiment of a processor component of the across-track formatting system of these teachings.

DETAILED DESCRIPTION

In one embodiment of the method of these teachings, the desired positioning pattern, while being used upon recording and/or reading of user data in the longitudinal direction, can be recorded in the tangential (transverse to the longitudinal direction) direction during the formatting process under the condition that there is a predetermined sufficient spatial separation between subsequent servomarks.

Upon reading and recording of user data it is desirable to follow one selected track precisely. Following one selected track can be enabled by having well defined servomarks at well-defined repetitive positions along the path of the track. In one embodiment, these servomarks have a precise size (in its simplest form round marks of a size equal to or near the minimum feature size that can be recorded with the given optical system) and have been recorded during the formatting step. These servomarks occur during regular intervals. (FIG. 1 shows "virtual" tracks running in the longitudinal direction of the tape.) If the spacing between these servomarks satisfies certain limits, each can be detected and its information can be sampled to provide a regular stream of tangential position information. This stream of digital error values is then processed by the tracking servo, which closes the loop by generating a continuous output signal that drives the tracking actuator. The sampling frequency of the servo pits should be at least 2x higher than the desired bandwidth of the tracking loop. Such a "sampled servo system" is conventional and one exemplary embodiment, these teachings not being limited to that example, is described in U.S. Pat. No. 5,452,285 "Distributed Digital Servo for Optical Information Storage Media" in the name of M. J. Monen, which is hereby incorporated by reference.

The derivation of tracking error information from each sample of a servomark is possible by several methods, some of which use a quad diode for measuring the light returned from the servomark. If the beam of reflected laser light from the optical surface is projected on a quad diode as shown in FIG. 2, one conventional method includes comparing the light from the left with the light from the right by subtracting (A+C)−(B+D): the "push-pull" (PP) method. Another conventional method includes comparing the timing of the front edge and the trailing edge of the mark for each quadrant (A+D)−(B+C): the "Differential Phase Detection" (DPD) method. References for each method can for example be found in pp. 72-73 of "Principles of Optical Disc Systems" by G. Bouwhuis et al. (Adam Hilger Ltd 1985) and "Standard ECMA-272 June 1999" for 120 mm DVD rewritable disk (DVD-RAM), Annex C: "Measurement of Differential Tracking," both of which are incorporated by reference.

If, in an exemplary instance, there is only one servomark required in a string of 256 bytes along the track (including the byte that contains the servomark), then there will be time available between the writing of two subsequent servomarks in the same track (in one embodiment, a data track). This available time can be used to record servomarks in many adjacent tracks if the beam that writes these servomarks is translated in a direction that is perpendicular to the direction of the movement of the tape. In the embodiment in which the tape moves in the longitudinal direction with velocity x m/s and the beam can be moved across the tape with velocity y m/s over a certain distance of z meter after which the beam returns to its starting position, the resulting path of the beam over the tape will follow a "sawtooth" pattern, as shown in FIG. 3. The angle A between the slope of the sawtooth path and the longitudinal direction of the tape is substantially given by tan A=y/x. The length of each slope is substantially L=z/y*SQRT $(x^2+y^2)$ and the time duration for each slope is substantially T=z/y.

An exemplary embodiment, presented to better illustrate the present teachings, but not a limitation of the present teachings, includes a tape speed of x=5 m/s, a tangential beam speed of y=10 m/s and a tangential distance of z=1 mm. In this exemplary embodiment, the sawtooth angle is 63.4 degrees and the sawtooth period T=100 usec. During the sawtooth period, the tape will have moved 500 um. If a byte can be recorded in 2 um of tracklength, then 250 bytes will separate successive servomarks in the same track. (or 256 bytes for a bytelength of 1.95 um) The formatting beam will write a servomark to the tape surface every time it crosses the center of each "virtual" track. The resultant servomark pattern is shown in FIG. 4. (FIG. 4 shows the in-track alignment and repetition distance of servomarks in each track.)

Upon reading/writing of user data at the same tape speed of 5 m/s, the servomark sample frequency is 10 kHz, well above the minimum of 4 kHz, required to achieve a bandwidth of approx 2 kHz for the tracking loop.

The same periodicity of 256 bytes is obtained if the tangential distance of the sawtooth z is increased to 10 mm and the tangential beam velocity is increased with the same factor to y=100 m/s.

In another embodiment, with a desired track-to-track distance of approx 1 um, the tangential distance z=1 mm will then comprise 1000 tracks, and the servomark recording frequency will be 10 MHz with y=10 m/s. Similarly for z=10 mm, 10,000 tracks are obtained and the servomark recording frequency is 100 MHz with y=100 m/s.

The above exemplary embodiments illustrate that there is a large range of choices in covering bands of different width z with enough servomarks to ensure that enough positioning information is distributed over the total number of tracks within such band, so as to insure adequate derivation of track error signals, by employing the characteristic feature of these teachings to write servomarks during the formatting step of the tape in a direction perpendicular to the movement of the tape and the longitudinal direction of the tracks. (In some embodiment, it is desirable for a number of reasons that the track direction and tape movement direction be substantially identical. For example if the reading/writing of user data would be done in a perpendicular or slanted direction with respect to the tape direction, there will be a frequent need to reacquire synchronization at the initialization of each track segment. This will require additional overhead and reduce the available user capacity.)

In a further embodiment, a different repetition frequency of servomarks than the 256 bytes used above is selected. In one exemplary embodiment, a repetition of one servomark per every 64 bytes is achieved by changing the tape velocity to 2.5 m/s and changing the tangential beam velocity to 20 m/s.

The angle A that results from the ratio of the longitudinal tape speed and the tangential beam velocity can be compensated for by selecting a direction of the write beam that is not substantially perpendicular to the tape direction but instead is chosen to occur under an angle that is substantially equal to (−A) degrees. This has for effect to compensate for the tape movement during the time between the recording of each servomark in adjacent tracks. The result is a substantially perfectly aligned array of servomarks in the tangential direction of the tape as shown in FIGS. 5 and 6.

An embodiment of the system of these teachings is shown in FIG. 7. Referring to FIG. 7, the embodiment 100 of the system of these teachings creates servo marks on a tape 110 that is being transported by a transport system 120 in a longitudinal direction 115 (indicated by the arrow in FIG. 7). (The transport system is a conventional transport system, such as, but not limited to, that shown in U.S. Pat. No. 6,690, 639, or U.S. Pat. No. 4,884,260, or U.S. Pat. No. 6,381,096, all of which are incorporated by reference herein.) The embodiment 100 of the system of these teachings includes one or more lasers 130, a deflection component 150, a deflection control component 160 and a laser timing control component 140. The deflection component 150 contains a deflection element 155 such as, but not limited to, a galvo mirror, a rotating polygon, an acousto-optical deflector or an electro-optical deflector. The deflection component 150 deflects the laser beam in a direction substantially transverse to the longitudinal direction 115 of tape motion. The deflection can occur at 90° to the longitudinal direction 115 or at a predetermined angle (such as the angle −A in FIG. 5). The deflection control (in one embodiment, in conjunction with the design of the deflection component 150) determines the path of the laser beam (such as the sawtooth path shown in FIG. 3). The laser timing control component determines the time and duration of the creation of servomarks (such as the configuration shown in FIG. 4 or FIG. 5). It should be noted that a processor component 200 as shown in FIG. 8 can be used in conjunction with the laser timing control component 140 and the deflection control component 160, shown in FIG. 7. The laser timing control component 140 and the deflection control component 160 can, in one embodiment, include one or more processors 230 (FIG. 8) and one or more computer usable media 250 (FIG. 8) having computer readable code embodied therein that causes the one or more processors to control the laser timing and/or the deflection component in order to obtain the desired servomark pattern. In embodiments in which the laser timing control component 140 and the deflection control component 160 include one or more processors 230 and one or more computer usable media 250, the one or more processors 230 are operatively connected to the one or more computer usable media 250 by interconnection means 220 (such as, but not limited to, a computer bus or a carrier wave). It should be noted that the laser timing control component 140 and the deflection control component 160 can utilize the same processor and the same computer readable media and that other combinations in which the laser timing control component 140 and the deflection control component 160 share one of the two above-mentioned components are also possible.

There are multiple advantages to deflection of the formatting beam under a predetermined angle A, resulting in a servomark pattern as shown in FIG. 5. First this will allow for maintaining clock synchronization between tracks. Secondly it will ensure that all servo bytes, defined as bytes that contain the unique servomarks, are all aligned in the tangential direction. This will ensure that it is impossible for data that will be recorded later in one track, to be positioned adjacent to a servobyte in the adjacent track, which could lead to a situation where the integrity of detection of the servobyte, influenced "from the side", will be corrupted. This will contribute significantly to the reliability of the track following servo. Thirdly this alignment will also allow for maintaining the same block addresses between adjacent tracks. The net result is that random access between tracks can be performed with enhanced reliability and significantly increased speed.

In one embodiment, the sawtooth pattern of the beam movement of the formatting beam in the tangential (90 degrees) direction or the (90-A) degree direction can be obtained by a rotating optical polygon with multiple facets, against which the formatting laser beam is reflected. In an exemplary embodiment, when the rotating optical polygon has 12 facets, then each facet covers an angle of 360/12=30 degrees. This angle can be configured optically to move the reflected beam over the desired distance z, so that the distance z is traveled in the same time as required for the polygon to turn from one facet to the next. Depending on the optical accuracy of the facet transitions, this will result in a near perfect sawtooth pattern of the formatting beam.

In another embodiment, a sawtooth pattern is approximated using a galvo mirror that is driven by an electronic sawtooth signal. In this exemplary embodiment, after completing the slope, a certain allowance in time needs to be made for a return to the start position depending on the mass and inertia of the galvo mirror and depending on the bandwidth of the control loop of which the galvo mirror will be part. However a non-zero return time can be easily accommodated within the design of these teachings by adapting the angle A and/or the beam velocity y.

In yet another embodiment, the one or more formatting optical beams are deflected by one or more acousto-optic modulators in order to approximately obtain the sawtooth pattern.

It should be noted that the above embodiments enable the recording of the servomark pattern in one pass (from substantially a beginning of the optical tape to substantially an end of the optical tape) while moving the tape from one end to the other. It should also be noted that the above embodiments provide a method for and result in substantially optimized space for recording data.

Depending on the limitation of the optical system chosen to steer the formatting beam, it may be advantageous, in some embodiments, to restrict the distance z to a value that is less than the full usable width of the tape. Typically tape configurations would be based on ½ inch tape width (12.6 mm), but also wider tape configuration could be contemplated. In order to maintain the advantage of the invention it can in such cases be desirable to group the tracks on the tape in bands in such a manner that the width of the bands is identical to the chosen tangential distance z of the formatting beam. Each band will contain a number of longitudinal tracks equal to the distance z divided by the track pitch. In one exemplary embodiment of these teachings, but not limited to this embodiment, z=1 mm and there are 10 bands of 1000 tracks each with a track pitch of 1 um, as shown in FIG. 6. In the embodiment shown in FIG. 6, each band is formatted with servomarks in an identical manner. In order to maintain the formatting of the entire tape in one pass in the exemplary embodiment described above, it will then be required to equip the formatter apparatus with 10 parallel formatting beam units, which has only a cost impact but does not pose any technological hurdle. For a one-pass formatting operation, in embodiments with multiple bands, each band is formatted simultaneously with its own formatting laser beam Some of the advantages of the invention lie in the fact that the formatting of all tracks grouped in one band can be performed within one pass of the tape and with a single beam light source as opposed to the use of multiple passes of the tape or the use of multibeam configurations. This has advantages for the time required to perform the formatting and it has advantages for the accuracy of the servomark pattern to be formatted on the tape, since all marks are written in a similar manner and any systematic errors in the recording of these marks will thus automatically cancel out. If the tape is to be configured with a number of separate bands, a separate laser beam can be deployed for the formatting of each band thus maintaining the capability of fully formatting all tracks on the tape in one pass.

Elements and components described herein may be further divided into additional components or joined together to form fewer components for performing the same functions.

Each computer program (code) within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

These teachings have been described with respect to various embodiments, it should be realized these teachings are also capable of a wide variety of further and other embodiments within the spirit and scope of the appended claims.

What is claimed is:

1. A method for providing servomarks on an optical tape, the method comprising the steps of:
   a) transporting the optical tape in a longitudinal direction;
   b) scanning at least one laser beam in another direction, the another direction being substantially transverse to the longitudinal direction;
   c) controlling an intensity of said at least one laser beam in order to form servomarks on the optical tape at predetermined positions along the another direction; and
   d) returning said at least one laser beam back to a position substantially on the longitudinal direction.

2. The method of claim 1 wherein the step of scanning said at least one laser beam comprises the step of selecting the another direction at a predetermined angle with respect to a direction substantially perpendicular to the longitudinal direction.

3. The method of claim 2 wherein the predetermined angle comprises an angle substantially complementary to an angle resulting from a ratio of a longitudinal tape speed and a tangential beam velocity.

4. The method of claim 2 wherein the step of scanning said at least one laser beam comprises the step of reflecting said at least one laser beam from a facet of an optical polygon.

5. The method of claim 2 wherein the step of scanning said at least one laser beam comprises the step of reflecting said at least one laser beam from a galvo mirror.

6. The method of claim 2 wherein the step of scanning said at least one laser beam comprises the step of deflecting said at least one laser beam utilizing an acousto-optic modulator.

7. The method of claim 1 wherein the step of controlling an intensity of said at least one laser beam in order to form servomarks on the optical tape at predetermined positions along the another direction comprises the step of forming a plurality of servomarks, each servomark from said plurality of servomarks being substantially located on a data track from a plurality of data tracks.

8. The method of claim 7 wherein each one servomark from said plurality of servomarks located on one data track from a plurality of data tracks is substantially aligned with another servomark located on an adjacent data track.

9. The method of claim 1 wherein the step of controlling an intensity of said at least one laser beam in order to form servomarks on the optical tape comprises the step of forming a plurality of servomarks, said plurality of servomarks being formed in one pass of the optical tape from substantially a beginning of the optical tape to substantially an end of the optical tape.

10. The method of claim 1 wherein said at least one laser beam comprises a plurality of laser beams; and wherein the method comprises the step of:
    performing steps b) through d) for each laser beam from the plurality of laser beams;
    wherein a plurality of bands of formatted bands are recorded.

11. A system for writing servomarks on an optical tape, the system comprising:
    a transport system capable of transporting the optical tape in a longitudinal direction;
    at least one laser;
    at least one deflection component capable of deflecting at least one beam from the at least one laser;
    a deflection control component capable of controlling said at least one deflection component so that said at least one beam scans the optical tape in a direction substantially transverse to the longitudinal direction;
    a laser timing control component capable of controlling an intensity of said at least one beam in order to form servomarks on the optical tape at predetermined positions.

12. The system of claim 11 wherein said at least one beam comprises a plurality of beams; wherein said at least one deflection component capable of deflecting said plurality of beams; wherein said deflection control component is capable of controlling said at least one deflection component so that said plurality of beams scan the optical tape in a direction substantially transverse to the longitudinal direction; and wherein said timing control component capable of controlling an intensity of each beam from said plurality of beams in order to form a plurality of bands of servomarks on the optical tape.

13. The system of claim 11 wherein said at least one deflection component comprises at least one galvo mirror.

14. The system of claim 11 wherein said at least one deflection component comprises at least one rotating polygon.

15. The system of claim 11 wherein said at least one deflection component comprises at least one acousto-optical deflector.

16. The system of claim 11 wherein said deflection control component comprises at least one processor; and
    a computer usable medium having computer readable code embodied therein; said computer readable code being capable of causing a computer system to control said at least one deflection component in order to obtain a predetermined servomark pattern.

17. The system of claim 11 wherein said laser timing control component comprises at least one processor; and
    a computer usable medium having computer readable code embodied therein; said computer readable code being capable of causing a computer system to control the intensity of said at least one beam in order to form servomarks on the optical tape at predetermined positions.

* * * * *